United States Patent
McNeil et al.

(10) Patent No.: US 10,776,522 B1
(45) Date of Patent: Sep. 15, 2020

(54) ASYMMETRIC PROTECTION OF CIRCUIT DESIGNS

(71) Applicant: Xilinx, Inc., San Jose, CA (US)

(72) Inventors: Steven E. McNeil, Rio Rancho, NM (US); Jason J. Moore, Albuquerque, NM (US); Theodore A. Ennis, Fountain Hills, AZ (US)

(73) Assignee: Xilinx, Inc., San Jose, CA (US)

( * ) Notice: Subject to any disclaimer, the term of this patent is extended or adjusted under 35 U.S.C. 154(b) by 283 days.

(21) Appl. No.: 15/900,380

(22) Filed: Feb. 20, 2018

(51) Int. Cl.
*H04L 9/30* (2006.01)
*H04L 9/08* (2006.01)
*G06F 21/72* (2013.01)
*H04L 9/32* (2006.01)

(52) U.S. Cl.
CPC ............ *G06F 21/72* (2013.01); *H04L 9/0822* (2013.01); *H04L 9/0825* (2013.01); *H04L 9/30* (2013.01); *H04L 9/3242* (2013.01)

(58) Field of Classification Search
CPC ..... G06F 21/72; H04L 9/3242; H04L 9/0822; H04L 9/0825; H04L 9/30
USPC .......................................................... 380/30
See application file for complete search history.

(56) References Cited

U.S. PATENT DOCUMENTS

| 2011/0131401 | A1* | 6/2011 | Singh | G06F 21/31 713/2 |
|---|---|---|---|---|
| 2018/0176771 | A1* | 6/2018 | Yang | H04W 12/0023 |
| 2019/0044708 | A1* | 2/2019 | Dewan | H04L 63/0435 |
| 2019/0103957 | A1* | 4/2019 | Isobe | G09C 1/00 |

OTHER PUBLICATIONS

Nordrum, Amy, "Quantum Computer Comes Closer to Cracking RSA Encryption," [online] IEEE Spectrum, Mar. 3, 2016, retrieved from the Internet: <https://spectrum.ieee.org/tech-talk/computing/hardware/encryptionbusting-quantum-computer-practices-factoring-in-scalable-fiveatom-experiment>, 3 pg.

Kobie, Nicole, "The Quantum Clock is Ticking on Encryption- and Your Data is Under Threat," [online] WIRED UK, Oct. 4, 2016, retrieved from the Internet: <http://www.wired.co.uk/article/quantum-computers-quantum-security-encryption>, 7 pg.

Carter, Gene, "NSA Acknowledges Quantum Computing Threat," [online] Aug. 24, 2015, Embedded.com, retrieved from the Internet: <https://www.embedded.com/electronics-blogs/say-what-/44440210/NSA-acknowledges-quantum-computing-threat#>, 2 pg.

(Continued)

*Primary Examiner* — Ashokkumar B Patel
*Assistant Examiner* — Quazi Farooqui
(74) *Attorney, Agent, or Firm* — Kevin T. Cuenot (57) ABSTRACT

Protecting circuit designs can include, in response to receiving a first encrypted public key, generating, using a hash circuit within the integrated circuit, a first hash of the first encrypted public key. The first hash can be compared with a second hash that was previously stored within a non-volatile memory of the integrated circuit. In response to determining that the first hash matches the second hash, the first encrypted public key is decrypted resulting in a first decrypted public key. A determination is made whether received configuration data for the device is authentic using the first decrypted public key.

17 Claims, 6 Drawing Sheets

(56) References Cited

OTHER PUBLICATIONS

Simonite, Tom, "NSA Says It 'Must Act Now' Against the Quantum Computing Threat," [online] MIT Technology Review, Connectivity, Feb. 3, 2016, retrieved from the Internet: <https://www.technologyreview.com/s/600715/nsa-says-it-must-act-now-against-the-quantum-computing-threat/>, 5 pg.

Cox, Laura, "Quantum Computing and the Threat to Your Data," [online] Disruption, Dec. 14, 2016, retrieved from the Internet: <https://disruptionhub.com/quantum-computing-threat-data/>, 4 pg.

* cited by examiner

ASYMMETRIC PROTECTION OF CIRCUIT DESIGNS

TECHNICAL FIELD

This disclosure relates to integrated circuits (ICs) and, more particularly, to asymmetric protection of circuit designs configured for implementation within an IC.

BACKGROUND

Programmable integrated circuits (ICs) refer to a class of ICs that are programmed to perform specified functions. An example of a programmable IC is a field programmable gate array (FGPA). An FPGA typically includes an array of programmable tiles (e.g., circuit blocks). These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry, for example, includes a large number of interconnect lines of varying lengths interconnected by programmable interconnect points (PIPs). The programmable logic circuitry, for example, implements the logic of a user design using programmable elements that may include, for example, function generators, registers, arithmetic logic, and so forth.

The programmable IC is programmed by loading configuration data into internal configuration memory cells of the device. In general, the configuration data specifies a user circuit design. The user circuit design is physically implemented within the programmable IC upon loading the configuration data into the device. The configuration data defines how the programmable elements are configured. The collective states of the individual memory cells determine the function of the device.

Typically, the configuration data, or circuit designs, are protected using asymmetric authentication. Asymmetric authentication is also known as "public key authentication". Public key authentication is widely considered a secure mechanism for protecting data. Conventional computing systems built using the Harvard architecture or the von Neumann architecture, for example, require an inordinate amount of time to defeat public key authentication presuming the keys are of sufficient length.

SUMMARY

In one or more embodiments, a method, can include, in response to receiving a first encrypted public key, generating, using a hash circuit within an integrated circuit, a first hash of the first encrypted public key. The method can include comparing the first hash with a second hash using a comparison circuit, where the second hash was stored within a non-volatile memory of the integrated circuit during a previously performed registration process. The method can include, in response to determining that the first hash matches the second hash, decrypting the first encrypted public key using a decryption circuit resulting in a first decrypted public key. The method can include determining whether received configuration data for the integrated circuit is authentic using the first decrypted public key.

In one or more embodiments, an integrated circuit can include a non-volatile memory configured to store a first hash of a first encrypted public key, a hash circuit configured to generate a second hash from a second encrypted public key received by the integrated circuit, and a comparison circuit configured to compare the first hash with the second hash. The integrated circuit can include a decryption circuit configured to decrypt the second encrypted public key resulting in a second decrypted public key in response to the comparison circuit determining a match between the first hash and the second hash. The integrated circuit can include an authentication circuit configured to authenticate configuration data for the integrated circuit using the second decrypted public key.

In one or more embodiments, a method can include storing a first encrypted public key within a non-volatile memory of an integrated circuit during a registration process and, in response to receiving a second encrypted public key, comparing the first encrypted public key with the second encrypted public key. The method can include, in response to determining that the first encrypted public key matches the second encrypted public key, decrypting the first encrypted public key resulting in a first decrypted public key and determining whether configuration data for the integrated circuit is authentic using the first decrypted public key.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to asymmetric protection of circuit designs configured for implementation within an IC. Circuit designs are typically protected using asymmetric authentication. Asymmetric authentication involves the use of a public-private key pair. The private key is typically maintained in secret by a user, while the public key may be distributed to one or more other entities. Data that is to be authenticated is signed using the private key. Another entity in possession of the public key is capable of authenticating the signed data using the public key.

Asymmetric authentication relies upon complex computations to generate the public-private key pairs. Taking RSA (Rivest-Shamir-Adleman) type asymmetric authentication as an example, a conventional computing system is capable of defeating RSA authentication by determining two large prime numbers that yield the known public key, which may then yield the private key. Given the typical length of keys used, a conventional computer using the Harvard architecture or the von Neumann architecture would require years to defeat asymmetric authentication.

This is not the case with quantum computers. Quantum computers are significantly more efficient at performing the types of calculations needed to defeat asymmetric authentication than are computers using the Harvard architecture or the von Neumann architecture. Quantum computers are considered to be so well-suited to the types of calculations necessary to defeat asymmetric authentication (e.g., prime number factorization) that asymmetric authentication will be virtually useless as quantum computers become available and are scaled to the sizes necessary to crack modern asymmetric authentication schemes.

In accordance with the inventive arrangements described within this disclosure, data may be authenticated using aspects of asymmetric authentication. In one or more embodiments, the public key of the public-private key pair is encrypted. The public key is protected using encryption as if the public key were a private key. In particular embodiments, a data processing system is used to encrypt the public key. In other embodiments, the IC itself is used to encrypt the public key.

The encrypted public key is stored off-chip, e.g., by a device other than the IC. The encrypted public key may be provided to the IC at a later time for purposes of authenticating signed data provided to the IC. For example, the IC is capable of decrypting the encrypted public key in response to particular conditions and using the decrypted public key to authenticate data received by the IC and signed using the private key of the public-private key pair.

By applying encryption to the public key, e.g., using a symmetric key, the vulnerability of asymmetric authentication to quantum computers may be significantly reduced if not eliminated. Quantum computers, like conventional computing architectures, require a significant amount of time (e.g., years) to defeat symmetric key encryption.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
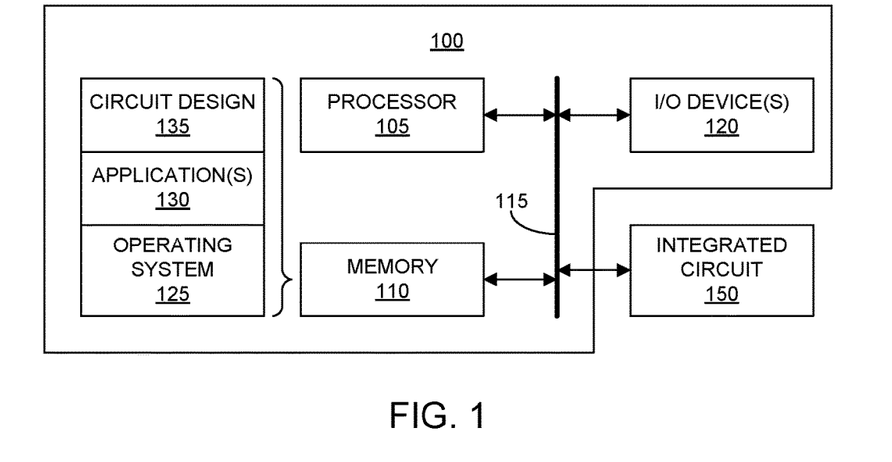
FIG. 1 illustrates an example of a data processing system for use with one or more embodiments described herein.

FIG. 1 illustrates an example of a data processing system (system) 100 for use with one or more embodiments described herein. System 100 may be implemented as a computer or other system or device that is suitable for storing and/or executing program code. In the example of FIG. 1, system 100 includes at least one processor 105. Processor 105 is coupled to memory 110 through interface circuitry 115. System 100 stores computer readable instructions (also referred to as "program code") within memory 110. Memory 110 is an example of computer readable storage media. Processor 105 executes the program code accessed from memory 110 via interface circuitry 115.

Memory 110 includes one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM", synchronous DRAM or "SDRAM", and double data rate RAM or "DDR RAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code in order to reduce the number of times program code must be retrieved from a bulk storage device during execution.

As noted, memory 110 is capable of storing program code. The program code may include routines, programs, objects, components, logic, data structures, and so on. For purposes of illustration, memory 110 stores an operating system 125, one or more application(s) 130, and a circuit design 135. In an aspect, operating system 125 and application(s) 130, being implemented in the form of executable program code, are executed by system 100 and, more particularly, by processor 105, to perform one or more of the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of the system.

Examples of interface circuitry 115 include, but are not limited to, an input/output (I/O) subsystem, an I/O interface, a bus system, and a memory interface. For example, interface circuitry 115 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 further may include one or more input/output (I/O) devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, a network adapter, etc. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

In the example of FIG. 1, system 100 is coupled to, or includes, a IC 150. In one or more embodiments, IC 150 is a programmable IC. As an illustrative and non-limiting example, IC 150 may be a field programmable gate array (FPGA). IC 150, while including programmable circuitry, may also include one or more hardwired circuit blocks. These hardwired circuit blocks are operable without first configuring IC 150. For example, the hardwired circuit blocks are capable of performing operations without first loading configuration data specifying a circuit design into IC 150.

In one or more embodiments, the hardwired circuit blocks include authentication circuitry. The authentication circuitry included in IC 150, to be described herein in greater detail, is capable of performing operations including, but not limited to, generating hashes of received data, encrypting data, decrypting data, and/or authenticating data. System 100 is capable of interacting with IC 150 to facilitate one or more of the operations described within this disclosure.

System 100 may include fewer components than shown or additional components not illustrated in FIG. 1 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory. System 100 may be implemented as a single system as shown or as a plurality of networked or interconnected systems each having an architecture the same as, or similar to, that of system 100.

System 100 and IC 150 are capable of interacting in a coordinated manner to protect circuit designs using a combination of authentication and encryption. The protection generally involves two separate stages. The first stage is referred to as registration. During registration, certain portions of data used for authentication are generated and/or encrypted. Certain items of these data are stored in IC 150 as part of the registration process.

The registration process effectively ties a public key of a public-private key pair to a particular IC, e.g., IC 150. The registration process may be performed in a variety of different ways as described in greater detail below. Example registration processes are described herein in connection with FIGS. 2, 3, and 4. In one or more embodiments, certain aspects of the registration process may be performed shortly after the IC is fabricated.

The second stage is referred to as configuration. The configuration process occurs when a user or other entity attempts to load configuration data into the IC. During configuration, configuration data is provided to the IC. The configuration data, for example, specifies a circuit design that is to be implemented within the IC. The IC is capable of authenticating the configuration data using, at least in part, data created and/or encrypted during the registration process. The IC is configured using the configuration data only in response to successful authentication of the configuration data. Example configuration processes are described in connection with FIGS. 5, 6, and 7.

Figure 2:
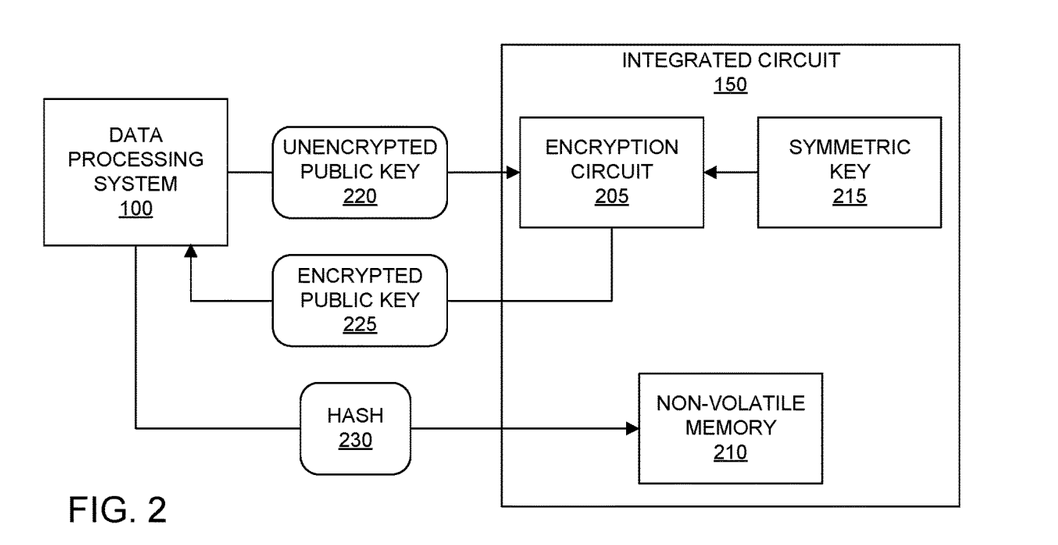
FIG. 2 illustrates an example of a registration process.

FIG. 2 illustrates an example of a registration process. The example registration process illustrated in FIG. 2 is performed using a data processing system and an IC such as system 100 and IC 150. Registration refers to operations performed by system 100 and IC 150, operating in a coordinated manner, to generate data and protect the public key of a public-private key pair for subsequent use during the configuration process.

IC 150 includes authentication circuitry that is hardwired and, as such, operable without first loading configuration data therein. The authentication circuitry may include a plurality of circuit structures such as an encryption circuit 205, non-volatile memory 210, and symmetric key 215. For ease of illustration, hardwired input and I/O ports of IC 150 are not explicitly illustrated. Still, IC 150 includes hardwired I/O ports for exchanging data with system 100 that are operable without first loading configuration data within IC 150.

Encryption circuit 205 is capable of encrypting received data and generating an encrypted version of the received data. Encryption circuit 205 utilizes symmetric key 215 to encrypt the received data. Symmetric key cryptography is a cryptography technique that uses the same key to encrypt unencrypted data, referred to as "plaintext", as is used to decrypt encrypted data, referred to as "ciphertext".

In one or more embodiments, symmetric key 215 is a device symmetric key. An example of a device symmetric key is a physically unclonable function (PUF). A PUF refers to a physical entity that is embodied in a physical microstructure, e.g., circuitry, within the IC. As implemented in hardware, a PUF may also be referred to as a one-way function. PUFs depend on the uniqueness of the physical microstructure of the IC in which the PUFs are implemented, which encompasses random physical factors introduced during manufacturing that tend to be unpredictable and uncontrollable. As such, it is virtually impossible to duplicate or clone a PUF structure. Further, a PUF is only readable within the IC.

A PUF implements challenge-response authentication to evaluate the structure upon which the PUF depends. When a physical stimulus is applied to the structure, the structure reacts in an unpredictable but repeatable way due to the complex interaction of the stimulus with the physical microstructure of the IC. PUFs and the measurement circuitry used to read or obtain the PUF are typically implemented in the same IC, e.g., IC 150.

Another example of a device symmetric key is a metal key. A metal key refers to circuitry within an IC that may be read to obtain a multi-bit pattern of data. An example of a metal key is a series of electrical nodes within the IC, which may include solder bumps or other connections, where particular ones of the nodes are tied to a logic low while other ones of the nodes are tied to a logic high thereby providing a secure bit pattern that is only readable within the IC and that may be used as a key.

In one or more other embodiments, symmetric key 215 may be generated external to IC 150, e.g., by system 100, and stored in a non-volatile memory within IC 150.

System 100 is capable of providing an unencrypted public key 220 to IC 150. Unencrypted public key 220 is the public key of a public-private key pair. Encryption circuit 205 is capable of encrypting unencrypted public key 220 using symmetric key 215. Encryption circuit 205 outputs encrypted public key 225, which is an encrypted version of unencrypted public key 220.

In the example of FIG. 1, system 100 receives encrypted public key 225. System 100 executes suitable program code to generate hash 230 from encrypted public key 225. Hash 230 may be implemented as a cryptographic hash. For example, system 100 is capable of executing one or more cryptographic hashing programs. Examples of cryptographic hashing functions that may be implemented in program code and executed by system 100 include, but are not limited to, the MD5, Secure Hash Algorithm (SHA)-1, SHA-2, and SHA-3. The cryptographic hashing functions described are for purposes of illustration. Other suitable cryptographic hashing functions may be used.

System 100 outputs hash 230 and provides hash 230 to IC 150. System 100 is capable of storing hash 230 within non-volatile memory 210 of IC 150. IC 150 is capable of storing hash 230 in non-volatile memory 210 for subsequent use during the configuration process as described in greater detail in connection with FIGS. 5, 6, and 7.

Figure 3:
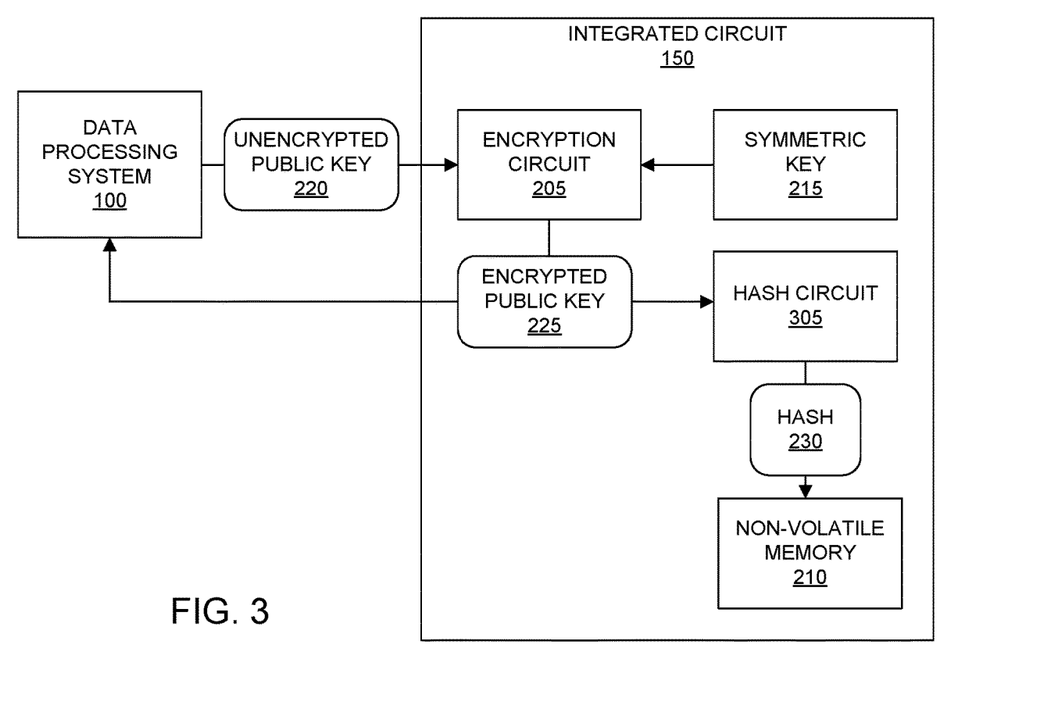
FIG. 3 illustrates another example registration process.

FIG. 3 illustrates another example registration process. The example of FIG. 3 operates substantially similar to the example of FIG. 2, although IC 150 is configured to generate hash 230 internally. In the example of FIG. 3, hash 230 is generated securely within IC 150 and maintained therein. Accordingly, in the example of FIG. 3, the authentication circuitry of IC 150 includes encryption circuit 205, non-volatile memory 210, symmetric key 215, and hash circuit 305.

As shown, encryption circuit 205 generates encrypted public key 225 from unencrypted public key 220. Hash circuit 305 is a hardwired circuit implemented within IC 150 that is capable of generating hashes of received data. Hash circuit 305, for example, is configured as a hardware implementation of a hash function as described herein in connection with FIG. 2. For example, hash circuit 305 may be configured as a hardware implementation of MD5, SHA-1, SHA-2, SHA-3, or other suitable hash function. Hash circuit 305 outputs hash 230 and stores hash 230 within non-volatile memory 210.

Figure 4:
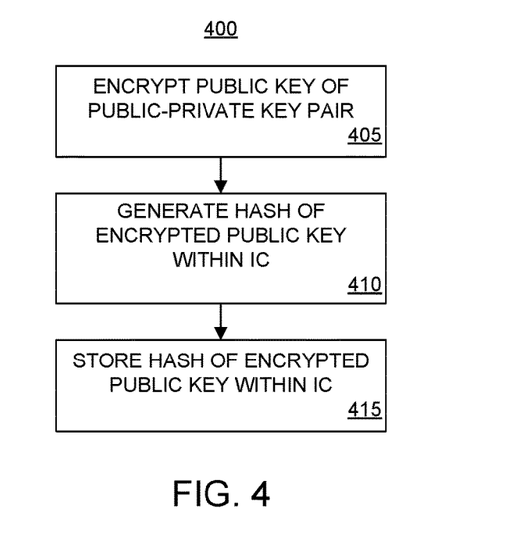
FIG. 4 illustrates an example method of registration.

FIG. 4 illustrates an example method 400 of registration. Method 400 may be performed using a data processing system (system) and/or an IC as described herein in connection with FIGS. 1, 2, and/or 3.

In block 405, the public key of a public-private key pair is encrypted. The system is capable of providing the public key, in unencrypted form, to the IC. The IC, in response to receiving the unencrypted public key, encrypts the unencrypted public key to generate an encrypted public key. The encryption circuit of the IC may use any of a variety of different symmetric keys for performing encryption. In an example, the symmetric key may be a key that is loaded into the IC from an external system or device. In another example, the symmetric key may be a device symmetric key such as a PUF or a metal key.

In one or more embodiments, a system or device is capable of encrypting the unencrypted public key using a symmetric key to generate the encrypted public key. In that case, the system or device is capable of storing the symmetric key within the IC for subsequent use, e.g., in a non-volatile memory.

In block 410, a hash of the encrypted public key is generated. In one or more embodiments, the system generates the hash as described herein in connection with FIG. 2. In one or more other embodiments, the IC generates the hash using a hash circuit implemented therein as described herein in connection with FIG. 3. The hash is a cryptographic hash as described herein of the encrypted public key.

The hashing described in connection with FIGS. 2, 3, and 4 allows the IC to reduce the size of the key data that is stored in non-volatile memory therein. Often, keys may be 1024, 2048, or 4096 bits in size. Storing a key of this size consumes significant memory resources of the IC. In addition, in some cases, more than one authentication key may be required to authenticate a given circuit design, thereby requiring even more memory resources of the IC. By creating a hash of the encrypted public key and storing the hash in the non-volatile memory of the IC instead of the encrypted public key itself, significantly less memory of the IC is required. As an illustrative and non-limiting example, a hash of a key of 4096 bits may be 256 bits or 384 bits depending on the particular hashing function that is used.

In block 415, the hash of the encrypted public key is stored in the IC. In the case where the system generates the hash, the system is capable of writing the hash to the non-volatile memory within the IC. In the case where the IC generates the hash internally, the hash circuit is capable of storing the hash within the non-volatile memory of the IC.

In one or more embodiments, the IC may be configured to store the entire encrypted public key therein. In such cases, hashing of the encrypted public key need not be performed. Rather, the encrypted public key is stored in non-volatile memory 210 in lieu of hash 230, for example. Further details relating to embodiments that do not utilize hashing are described in connection with FIG. 6.

With the registration process complete, the configuration process may be performed. It should be appreciated that configuration may be performed any time after registration. For example, while configuration may be performed immediately following registration, this need not be the case. As an illustrative and non-limiting example, the configuration process may be performed days or weeks following the registration process.

Figure 5:
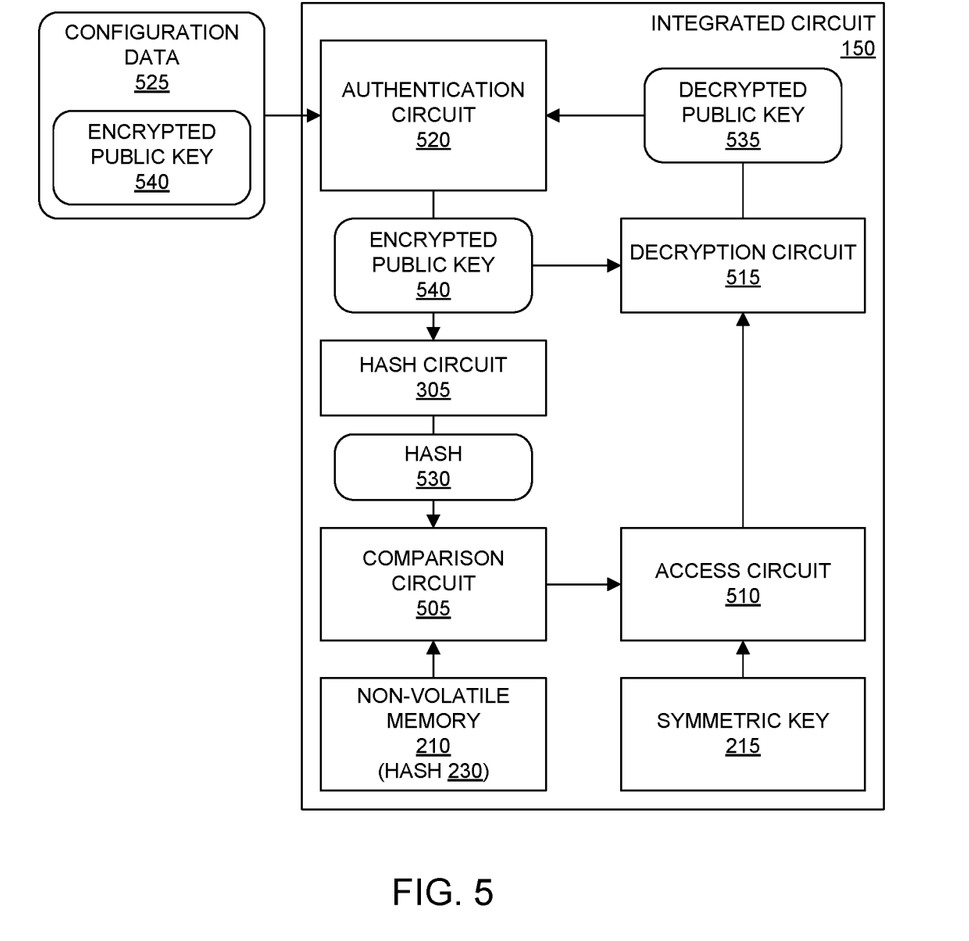
FIG. 5 illustrates an example of a configuration process.

FIG. 5 illustrates an example of a configuration process. The example configuration process of FIG. 5 may be performed using IC 150. The configuration process involves authenticating configuration data that is provided to IC 150 for purposes of implementing a particular circuit design therein. In the example of FIG. 5, the authentication circuitry of IC 150 includes non-volatile memory 210, symmetric key 215, comparison circuit 505, access circuit 510, hash circuit 305, decryption circuit 515, and authentication circuit 520.

In the example of FIG. 5, encrypted public key 540 and configuration data 525 are provided to IC 150. In one or more embodiments, encrypted public key 540 is embedded within configuration data 525 such that the two (encrypted public key 540 and configuration data 525) are provided as a single file. For example, encrypted public key 540 may be stored at a predetermined location within configuration data 525. In another example, encrypted public key 540 may be stored within configuration data 525 and separated from the actual data used to configure IC 150, referred to herein as a configuration bitstream, using a marker or other delimiter. Configuration data 525 and/or the configuration bitstream contained therein may be signed using the private key of the public-private key pair.

Authentication circuit 520 is capable of identifying encrypted public key 540 from within configuration data 525, extracting encrypted public key 540 therefrom, and providing encrypted public key 540 to hash circuit 205 and to decryption circuit 515. In particular embodiments, authentication circuit 520 is an asymmetric authentication circuit.

In one or more other embodiments, encrypted public key 540 may be provided to IC 150 separate from configuration data 525. For example, encrypted public key 540 may be provided as a first file while configuration data 525 is provided as a second, independent file. In that case, configuration data 525 still may include a configuration bitstream that is signed using the private key of the public-private key pair.

In the example of FIG. 5, configuration data 525 is only used to configure IC 150 once authenticated by authentication circuit 520. In one or more embodiments, the authentication process involves hash circuit 305 receiving encrypted public key 540 and generating a hash 530 of encrypted public key 540. Hash circuit 305, as discussed, is capable of generating a cryptographic hash such as hash 530. Hash circuit 305 provides hash 530 to comparison circuit 505.

Comparison circuit 505 is capable of comparing newly generated hashes of data received by IC 150 with a previously stored hash from non-volatile memory 210. Accordingly, comparison circuit 505 compares the hash generated from newly received data with the hash previously stored during the registration process. In one or more embodiments, comparison circuit 505 is capable of implementing the comparison using exclusive OR operations.

In response to receiving hash 530, comparison circuit 505 reads hash 230 from non-volatile memory 210. Comparison circuit 505 is capable of performing a comparison of hash 530 to hash 230, which was stored in non-volatile memory 210 during the registration process. Comparison circuit 505 is capable of determining whether hash 530 matches, e.g., is the same as, hash 230.

In response to determining that hash 530 does match hash 230, comparison circuit 505 is capable of notifying access circuit 510 of the determined match. In response to the match notification from comparison circuit 505, access circuit 510 allows decryption circuit 515 to read symmetric key 215. In the example of FIG. 5, comparison circuit 505 determines that hash 530 matches hash 230 as a prerequisite for decryption circuit 515 gaining access to symmetric key 215. Access circuit 510 serves as a gatekeeper controlled by comparison circuit 505 that prevents decryption circuit 515 from receiving symmetric key 215 until a match is determined by comparison circuit 505.

If comparison circuit 505 determines that hash 530 does not match hash 230, comparison circuit 505 is capable of initiating a lockdown mode within IC 150. In the lockdown mode, for example, IC 150 is not configured using configuration data 525. In one or more embodiments, IC 150 shuts down and no longer responds to any received inputs and does not generate any outputs.

Decryption circuit 515 is capable of decrypting encrypted public key 540 once access circuit 510 allows decryption circuit 515 to read symmetric key 215. Decryption circuit 515 decrypts encrypted public key 540 using symmetric key 215. Decryption circuit 515 decrypts encrypted public key 540 to generate decrypted public key 535, which is provided to authentication circuit 520.

Authentication circuit 520 is capable of receiving decrypted public key 535 and using decrypted public key 535 to authenticate configuration data 525. For example, authentication circuit 520 is capable of using decrypted public key 535 to authenticate the signed configuration bitstream of within configuration data 525.

In response to determining that configuration data 525, e.g., the configuration bitstream contained therein, is authentic, authentication circuit 520 is capable of initiating or allowing configuration of IC 150 using configuration data 525. For example, the configuration bitstream may be stored in appropriate configuration memory cells in response to being successfully authenticated by authentication circuit 520.

In response to determining that configuration data 525, e.g., the configuration bitstream contained therein, is not authentic, authentication circuit 520 is capable of initiating a lockdown mode within IC 150 as previously described.

Figure 6:
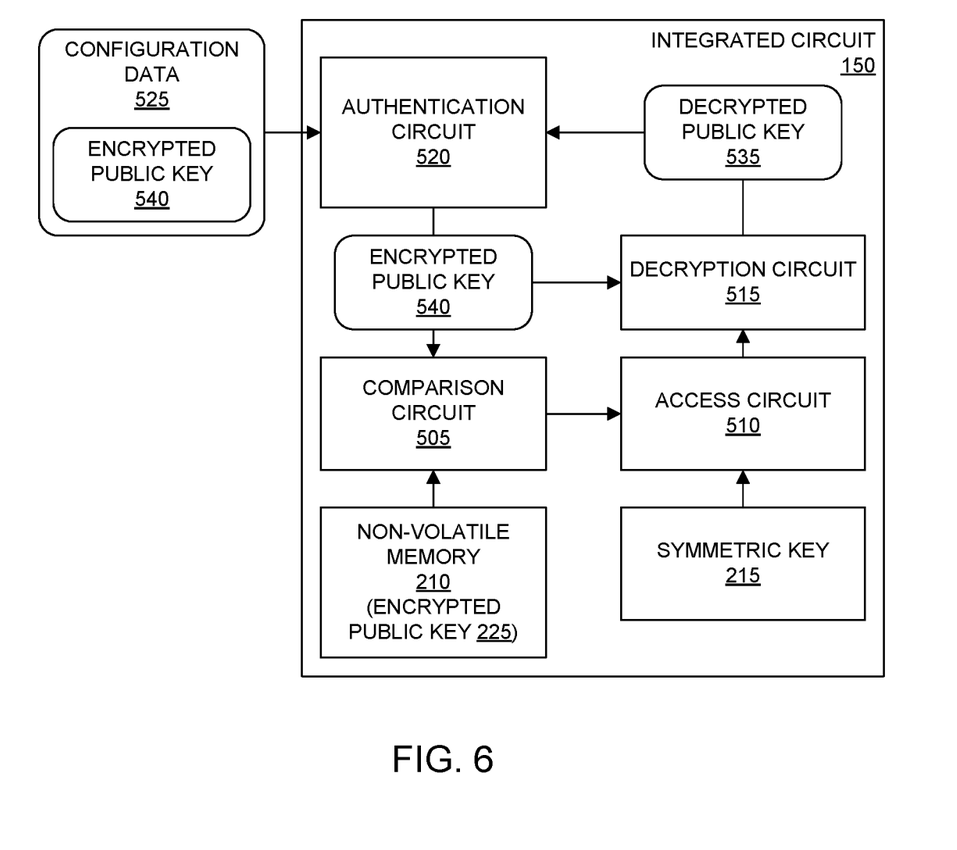
FIG. 6 illustrates another example of a configuration process.

FIG. 6 illustrates another example of a configuration process. The example configuration process of FIG. 6 may be performed using IC 150. The example of FIG. 6 is similar to that of FIG. 5. In the example of FIG. 6, hashing is not utilized. In the example of FIG. 6, the authentication circuitry of IC 150 includes non-volatile memory 210, symmetric key 215, comparison circuit 505, access circuit 510, decryption circuit 515, and authentication circuit 520.

In the example of FIG. 6, encrypted public key 225 is stored in non-volatile memory 210 during the registration process instead of a cryptographic hash of encrypted public key 225. Accordingly, subsequently, during the configuration process, comparison circuit 505 compares encrypted public key 540 with encrypted public key 225 stored in non-volatile memory 210 to determine whether encrypted public key 540 matches (e.g., is the same as) encrypted public key 225. In response to determining a match, comparison circuit notifies access circuit 510 of the match. In response to being notified of the match from comparison circuit 505, access circuit 510 allows decryption circuit 515 to access or read symmetric key 215. In response to determining that encrypted public key 540 does not match encrypted public key 225, comparison circuit 505 initiates the lockdown mode.

Figure 7:
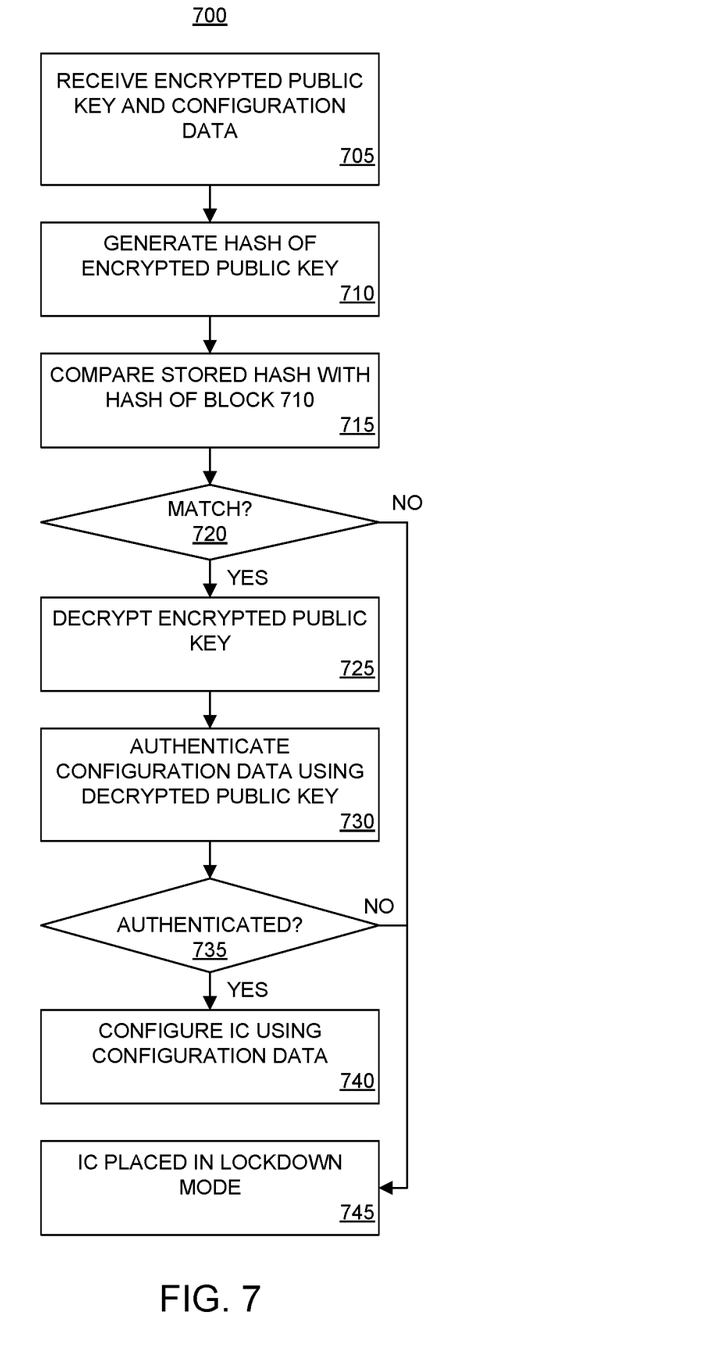
FIG. 7 illustrates an example method of configuration.

FIG. 7 illustrates an example method 700 of configuration. The configuration process illustrated in FIG. 7 may be performed using an IC as described herein in connection with FIGS. 1-6 and 8.

In block 705, the IC receives an encrypted public key and/or configuration data. For example, the IC may be powered on and read the configuration data and/or encrypted public key. As discussed, in one or more embodiments the encrypted public key is included within the configuration data. The configuration data may also include a configuration bitstream. In one or more other embodiments, the encrypted public key is provided to the IC separately and/or independently from the configuration data. As discussed, the configuration data and/or the configuration bitstream may be signed using the private key of the public-private key pair.

In block 710, the IC generates a hash of the encrypted public key. For example, the hash circuit of the IC is capable of generating a cryptographic hash of the encrypted public key received in block 705. In block 715, the IC is capable of comparing a previously stored hash of the encrypted public key of the public-private key pair with the hash generated in block 710. For example, the comparison circuit is capable of comparing the hash generated and stored during the registration process described within this disclosure with the hash generated in block 710. The comparison circuit is capable of determining whether the previously stored hash matches the hash generated in block 710. The IC is capable of using a comparison of hashes rather than a comparison of the actual encrypted public key to reduce the amount of data that must be stored in non-volatile memory.

In one or more other embodiments, the IC stores the encrypted public key in non-volatile memory during the registration process. In that case, the IC does not generate a hash of the encrypted public key received in block 705. Instead, the IC directly compares the encrypted public key received in block 705 with the encrypted public key stored during the registration process.

In block 720, in response to determining that the two hashes match (or the two encrypted public keys match as the case may be), method 700 continues to block 725. In response to determining that the two hashes do not match (or the two encrypted public keys do not match), method 700 continues to block 745. In block 745, the IC is placed in a lockdown mode. For example, the comparison circuit is capable of initiating the lockdown mode.

Continuing with block 725, the IC decrypts the encrypted public key. For example, in response to determining that the previously stored hash matches the hash generated in block 710 (or that the encrypted public key received in block 705 matches the encrypted public key stored during the registration), the comparison circuit provides a signal to the access circuit. The access circuit, in response to receiving the signal from the comparison circuit indicating a match, is capable of allowing the decryption circuit access to the symmetric key. The decryption circuit is capable of decrypting the encrypted public key using the symmetric key to generate the decrypted public key. As such, the fully public key in unencrypted form is available, but only within the IC. The decrypted public key is not output from the IC.

In block 730, the IC is capable of authenticating the configuration data using the decrypted public key. The authentication circuit is capable of authenticating the configuration data using the decrypted public key. In block 735, the IC determines whether the configuration data has been authenticated. For example, in response to the authentication circuit determining that the configuration data is authentic, method 700 continues to block 740. In response to the authentication circuit determining that the configuration data is not authentic, method 700 proceeds to block 745. In block 745, as discussed, the IC is placed in lockdown mode. In this case, for example, the authentication circuit is capable of initiating the lockdown mode.

In block 740, in response to successfully authenticating the configuration data, the IC is configured using the configuration data. For example, the authentication circuit, in response to successfully authenticating the configuration data, allows the configuration bitstream contained in the configuration data to be loaded into configuration memory cells of the IC. In one or more embodiments, the authentication circuit is coupled to a configuration controller (not shown) that loads configuration data into configuration memory cells of the IC in response to the authentication circuit successfully authenticating the configuration data.

Figure 8:
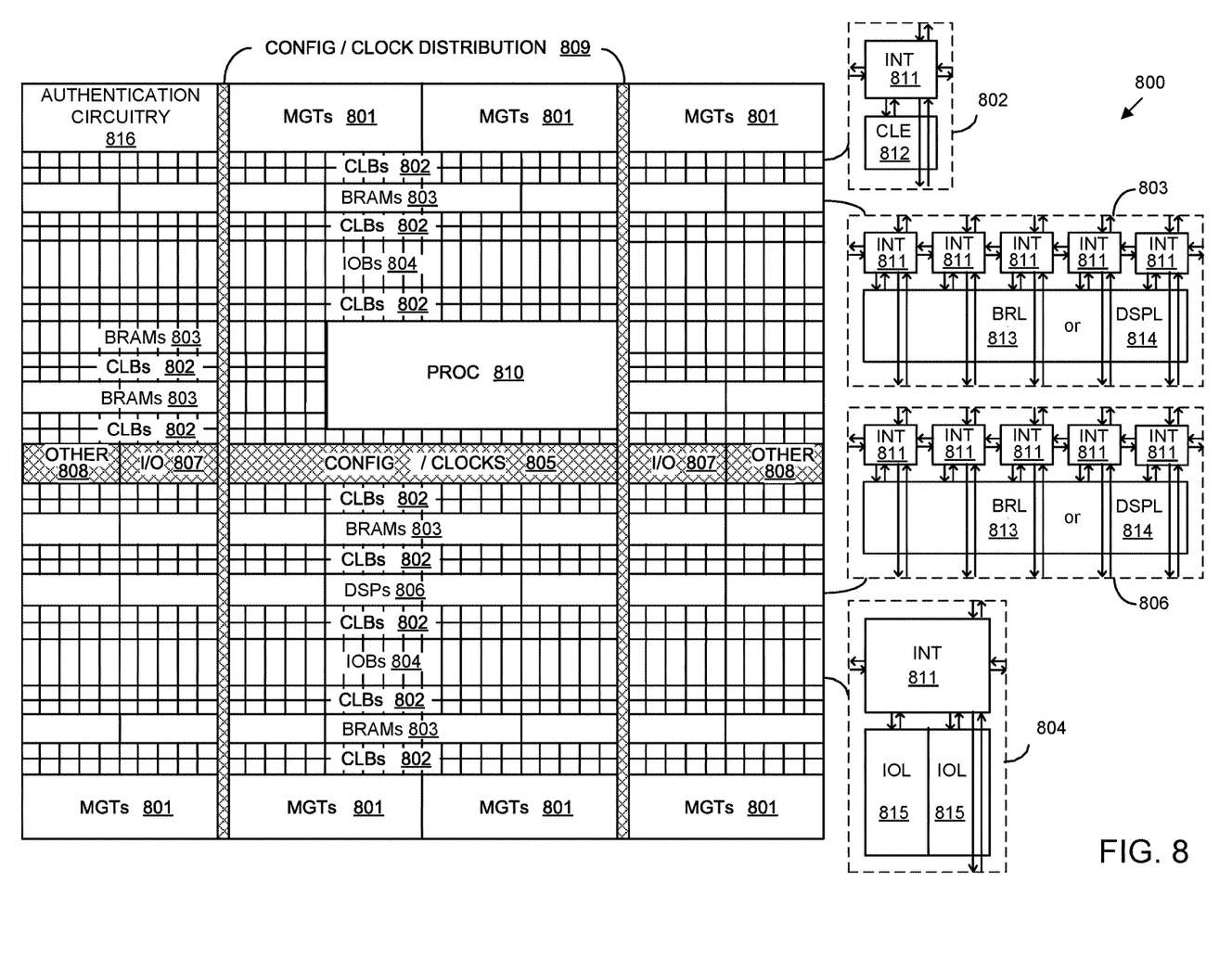
FIG. 8 illustrates an example architecture for an integrated circuit.

FIG. 8 illustrates an example architecture 800 for an IC. In one or more embodiments, architecture 800 may be used to implement IC 100 as described within this disclosure. In one aspect, architecture 800 may be implemented within a programmable IC. For example, architecture 800 may be used to implement an FPGA.

Architecture 800 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 800 includes several different types of programmable circuit, e.g., logic, blocks. For example, architecture 800 may include a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized I/O blocks 807 (e.g., configuration ports and clock ports), and other programmable logic 808 such as digital clock managers, analog-to-digital converters, system monitoring logic, and so forth.

In some ICs, each programmable tile includes a programmable interconnect element (INT) 811 having standardized connections to and from a corresponding INT 811 in each adjacent tile. Therefore, INTs 811, taken together, implement the programmable interconnect structure for the illustrated IC. Each INT 811 also includes the connections to and from the programmable logic element within the same tile, as shown by the examples included at the top of FIG. 8.

For example, a CLB 802 may include a configurable logic element (CLE) 812 that may be programmed to implement user logic plus a single INT 811. A BRAM 803 may include a BRAM logic element (BRL) 813 in addition to one or more INTs 811. Typically, the number of INTs 811 included in a tile depends on the height of the tile. As pictured, a BRAM tile has the same height as five CLBs, but other numbers (e.g., four) also may be used. A DSP tile 806 may include a DSP logic element (DSPL) 814 in addition to an appropriate number of INTs 811. An IOB 804 may include, for example, two instances of an I/O logic element (IOL) 815 in addition to one instance of an INT 811. The actual I/O pads connected to IOL 815 may not be confined to the area of IOL 815.

In the example pictured in FIG. 8, a columnar area near the center of the die, e.g., formed of regions 805, 807, and 808, may be used for configuration, clock, and other control logic. Horizontal areas 809 extending from this column may be used to distribute the clocks and configuration signals across the breadth of the programmable IC.

Some ICs utilizing the architecture illustrated in FIG. 8 include additional logic blocks that disrupt the regular columnar structure making up a large part of the IC. The additional logic blocks may be programmable blocks and/or dedicated circuitry. For example, a processor block depicted as PROC 810 spans several columns of CLBs and BRAMs.

In one aspect, PROC 810 may be implemented as dedicated circuitry, e.g., as a hardwired processor, that is fabricated as part of the die that implements the programmable circuitry of the IC. PROC 810 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 810 may be omitted from architecture 800 and replaced with one or more of the other varieties of the programmable blocks described. Further, such blocks may be utilized to form a "soft processor" in that the various blocks of programmable circuitry may be used to form a processor that can execute program code as is the case with PROC 810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 8 that are external to PROC 810 such as CLBs 802 and BRAMs 803 are considered programmable circuitry of the IC.

In general, the functionality of programmable circuitry is not established until configuration data is loaded into the IC.

A set of configuration bits may be used to program programmable circuitry of an IC such as an FPGA. The configuration bit(s) typically are referred to as a configuration bitstream. In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 810.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 810 or a soft processor. In some cases, architecture 800 includes a dedicated configuration processor that loads the configuration bitstream to the appropriate configuration memory and/or processor memory. The dedicated configuration processor does not execute user-specified program code. In other cases, architecture 800 may utilize PROC 810 to receive the configuration bitstream, load the configuration bitstream into appropriate configuration memory, and/or extract program code for execution.

In the example of FIG. 8, architecture 800 includes authentication circuitry 816. In one or more embodiments, authentication circuitry 816 includes an encryption circuit, a decryption circuit, a hashing circuit, a non-volatile memory, a device symmetric key, an authentication circuit, a comparison circuit, and/or an access circuit in any of the various combinations described herein in connection with FIGS. 1-7. Further, it should be appreciated that the IC (e.g., authentication circuitry 816) may include the circuit blocks for performing the registration process and the circuit blocks for performing the configuration process.

FIG. 8 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 8 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 810 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method can include, in response to receiving a first encrypted public key, generating, using a hash circuit within an integrated circuit, a first hash of the first encrypted public key. The method can include comparing the first hash with a second hash using a comparison circuit, where the second hash was stored within a non-volatile memory of the integrated circuit during a previously performed registration process. The method can include, in response to determining that the first hash matches the second hash, decrypting the first encrypted public key using a decryption circuit resulting in a first decrypted public key. The method can include determining whether received configuration data for the integrated circuit is authentic using the first decrypted public key.

In one aspect, the decrypting is performed using a symmetric key. In another aspect, the symmetric key is a device symmetric key.

In another aspect, the method further includes, in response to receiving an unencrypted public key, encrypting, using an encryption circuit within the integrated circuit, the unencrypted public key using a symmetric key resulting in the first encrypted public key during the registration process. In another aspect, the symmetric key is a device symmetric key.

In another aspect, the method further includes, using a data processing system, encrypting an unencrypted public key using a symmetric key resulting in the first encrypted public key and loading the symmetric key within a non-volatile memory of the integrated circuit. The symmetric key may be used during a subsequent configuration process within the integrated circuit.

In another aspect, the method further includes initiating a lockdown mode within the integrated circuit in response to determining that the first hash does not match the second hash.

In another aspect, the method further includes initiating a lockdown mode within the integrated circuit in response to determining that the configuration data is not authentic.

In another aspect, the integrated circuit is a programmable integrated circuit.

In another aspect, the programmable integrated circuit is not configured with any configuration data prior to successfully authenticating the configuration data.

In another aspect, the first hash and the second hash are cryptographic hashes.

In one or more embodiments, an integrated circuit can include a non-volatile memory configured to store a first hash of a first encrypted public key, a hash circuit configured to generate a second hash from a second encrypted public key received by the integrated circuit, and a comparison circuit configured to compare the first hash with the second hash. The integrated circuit can include a decryption circuit configured to decrypt the second encrypted public key resulting in a second decrypted public key in response to the comparison circuit determining a match between the first hash and the second hash. The integrated circuit can include an authentication circuit configured to authenticate configuration data for the integrated circuit using the second decrypted public key.

In one aspect, the decryption circuit decrypts the second encrypted public key with a symmetric key stored within the integrated circuit.

In another aspect, the symmetric key is a device symmetric key.

In another aspect, the comparison circuit is configured to allow the decryption circuit to read the symmetric key in response to determining a match between the first hash and the second hash.

In another aspect, the integrated circuit is a programmable integrated circuit and the authentication circuit, the hash circuit, the comparison circuit, the decryption circuit and the non-volatile memory are hardwired circuits.

In another aspect, the comparison circuit is configured to initiate a lockdown mode in the integrated circuit in response to determining that the first hash does not match the second hash.

In another aspect, the authentication circuit is configured to initiate a lock down mode in the integrated circuit in response to determining that the configuration data is not authentic.

In another aspect, the first hash and the second hash are cryptographic hashes.

In one or more embodiments, a method can include storing a first encrypted public key within a non-volatile memory of an integrated circuit during a registration process and, in response to receiving a second encrypted public key, comparing the first encrypted public key with the second encrypted public key. The method can include, in response to determining that the first encrypted public key matches the second encrypted public key, decrypting the first encrypted public key resulting in a first decrypted public key and determining whether configuration data for the integrated circuit is authentic using the first decrypted public key.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:

in response to receiving a first encrypted public key, generating, using a hash circuit within an integrated circuit, a first hash of the first encrypted public key, wherein the first encrypted public key is encrypted using a symmetric key;

wherein the symmetric key is a device symmetric key and includes a physically unclonable function corresponding to the integrated circuit or a metal key implemented within the integrated circuit;

comparing the first hash with a second hash using a comparison circuit implemented within the integrated circuit, wherein the second hash is stored within a non-volatile memory of the integrated circuit during a previously performed registration process;

in response to determining that the first hash matches the second hash, reading the symmetric key from within the integrated circuit and decrypting the first encrypted public key resulting in a first decrypted public key, wherein the decrypting is performed using the symmetric key, and wherein the reading and the decrypting are performed by a decryption circuit implemented within the integrated circuit; and determining whether configuration data for the integrated circuit is authentic using the first decrypted public key.

2. The method of claim 1, further comprising:

in response to receiving an unencrypted public key, encrypting, using an encryption circuit within the integrated circuit, the unencrypted public key using the symmetric key resulting in the first encrypted public key during the previously performed registration process.

3. The method of claim 1, further comprising:

using a data processing system, encrypting an unencrypted public key using the symmetric key resulting in the first encrypted public key.

4. The method of claim 1, further comprising:

initiating a lockdown mode within the integrated circuit in response to determining that the first hash does not match the second hash.

5. The method of claim 1, further comprising:

initiating a lockdown mode within the integrated circuit in response to determining that the configuration data is not authentic.

6. The method of claim 1, wherein the integrated circuit is a programmable integrated circuit.

7. The method of claim 6, wherein the programmable integrated circuit is not configured with any configuration data prior to successfully authenticating the configuration data.

8. The method of claim 1, wherein the first hash and the second hash are cryptographic hashes.

9. An integrated circuit, comprising:

a non-volatile memory configured to store a first hash of a first encrypted public key, wherein the first hash is stored within the non-volatile memory of the integrated circuit during a previously performed registration process;

a hash circuit configured to generate a second hash from a second encrypted public key received by the integrated circuit, wherein the second encrypted public key is encrypted using a symmetric key;

wherein the symmetric key is a device symmetric key and is a physically unclonable function corresponding to the integrated circuit or a metal key implemented within the integrated circuit;

a comparison circuit configured to compare the first hash with the second hash;

a decryption circuit configured to decrypt the second encrypted public key resulting in a second decrypted public key;

wherein the decryption circuit, in response to the comparison circuit determining a match between the first hash and the second hash, is configured to read the symmetric key from within the integrated circuit and decrypt the second encrypted public key using the symmetric key; and an authentication circuit configured to authenticate configuration data for the integrated circuit using the second decrypted public key.

10. The integrated circuit of claim 9, wherein the comparison circuit is configured to allow the decryption circuit to read the symmetric key in response to determining the match between the first hash and the second hash.

11. The integrated circuit of claim 9, wherein the integrated circuit is a programmable integrated circuit and the authentication circuit, the hash circuit, the comparison circuit, the decryption circuit and the non-volatile memory are hardwired circuits.

12. The integrated circuit of claim 9, wherein the comparison circuit is configured to initiate a lockdown mode in the integrated circuit in response to determining that the first hash does not match the second hash.

13. The integrated circuit of claim 9, wherein the authentication circuit is configured to initiate a lock down mode in the integrated circuit in response to determining that the configuration data is not authentic.

14. The integrated circuit of claim 9, wherein the first hash and the second hash are cryptographic hashes.

15. The integrated circuit of claim 9, wherein the integrated circuit is a programmable integrated circuit.

16. The integrated circuit of claim 15, wherein the integrated circuit is not configured with any configuration data prior to successfully authenticating the configuration data.

17. The integrated circuit of claim 9, further comprising:

an encryption circuit configure to, in response to receiving an unencrypted public key, encrypting the unencrypted public key using the symmetric key resulting in the second encrypted public key during the previously performed registration process.

* * * * *